United States Patent
Kuttner et al.

[11] Patent Number: 5,810,424
[45] Date of Patent: Sep. 22, 1998

[54] WIND DEFLECTING BODY FOR A TWO-SEAT CONVERTIBLE

[75] Inventors: Hans-Peter Kuttner, Weil im Schönbuch; Uwe Wacker, Schönaich; Peter Müller, Sindelfingen, all of Germany

[73] Assignee: Mercedes-Benz AG, Stuttgart, Germany

[21] Appl. No.: 696,729

[22] Filed: Aug. 14, 1996

[30] Foreign Application Priority Data

Aug. 14, 1995 [DE] Germany .................. 195 29 882.9

[51] Int. Cl.[6] ........................................ B60J 7/22
[52] U.S. Cl. .................. 296/180.1; 296/37.8; 296/85
[58] Field of Search ................ 298/180.1, 37.8, 298/85

[56] References Cited

U.S. PATENT DOCUMENTS

| | | | |
|---|---|---|---|
| 1,275,400 | 8/1918 | Crowell | 296/180.1 |
| 3,246,923 | 4/1966 | Turner | 296/180.1 |
| 4,592,571 | 6/1986 | Baumann et al. | 296/180.1 |
| 5,211,718 | 5/1993 | Götz et al. | 296/85 |

FOREIGN PATENT DOCUMENTS

| | | | |
|---|---|---|---|
| 3914036 | 4/1990 | Germany | 296/85 |
| 3929831C1 | 11/1990 | Germany . | |
| 4037705C1 | 10/1991 | Germany . | |
| 4239428A1 | 3/1994 | Germany . | |
| 4320420 A1 | 12/1994 | Germany | 296/85 |
| 618608 | 3/1961 | Italy | 296/180.1 |

OTHER PUBLICATIONS

DEC4037705. 1996 Derwent Information Ltd. Abstract. Wind deflector for convertible motor vehicle.

*MOT* journal, vol. 16/1995, pp. 14–16 etc., by Von Hermann Reil, "Die Neue R–Klasse".

*Primary Examiner*—Gary C. Hoge
*Attorney, Agent, or Firm*—Evenson McKeown Edwards & Lenahan, PLL

[57] ABSTRACT

A two-seat convertible has wind deflecting bodies which are disposed behind the headrests of the vehicle seats and rest on the vehicle body top rear side and project upwards to approximately the height of the upper edge of the respective headrest. The headrests are constructed in the shape of a hood which tapers toward the rear and is approximately parabolic with respect to the outer contour, in which case the contour of a headrest is situated within the flow-around area of the surface of the assigned wind deflecting body which projects upwards in the front. Each wind deflecting body can be detachably fastened on the vehicle body.

25 Claims, 2 Drawing Sheets

WIND DEFLECTING BODY FOR A TWO-SEAT CONVERTIBLE

BACKGROUND AND SUMMARY OF THE INVENTION

This invention relates to a wind deflecting body for a two-seat convertible which extends in use in each case behind a headrest of a vehicle seat, resting on a rear top side in the form of a hood which tapers toward the rear and is approximately parabolic with respect to its outer contour, which extends in its height to approximately the height of the upper edge of the headrest, the contour of the headrest being situated within the flow-around area of the surface of the assigned wind deflecting body which projects upward in the front.

From the SLK convertible of the firm Mercedes-Benz (internal name: R 170), as illustrated in the journal *mot*, Vol. 16/1995, it is known to provide a vehicle body behind the vehicle seats with two hump-shaped wind deflecting bodies which have a large circumference in the front and taper in the direction of the vehicle rear. The air current, which is lifted by the windshield, is pressed downward again as the result of the pressure conditions and flows in from the vehicle rear, is deflected by these wind deflecting bodies again toward the front and upwards, in which case the surface of the wind deflecting bodies which projects upwards in the front reaches approximately to the height of the upper edge of the headrest situated in front of it and therefore guides the air current away over the headrest, whereby an occupant of the seat is not affected by this air current and the air swirls. The wind deflecting bodies are molded in one piece to the rear-side vehicle body, resulting in high manufacturing expenditures. In addition, these wind deflecting bodies make the displacement possibility for a vehicle roof which can be fully automatically lowered into the trunk more difficult or eliminate this possibility.

German Patent Document DE 40 37 705 C1 shows a wind deflecting device for a motor vehicle whose one horizontally disposed wind blocking plate is arched upwards behind each seat, whereby the air coming from the rear is guided a distance upwards toward the front, where another upright wind blocking plate adjoins which deflects the air current over the headrests. In order to sufficiently deflect the arriving air, therefore two mutually assigned wind blocking plates are required which, should they have to be removed, occupy a lot of storage space because of their width.

It is an object of the invention to improve the usage possibility for a wind deflecting body of the above-mentioned type, which projects upwards in the shape of a hood, in the case of two-seat convertibles.

This object is achieved in certain preferred embodiments of the invention by providing an arrangement of the above-noted type, wherein the wind deflecting body, which projects upwards in the shape of a hood, can be fixed by means of releasable locking devices on the vehicle body and, as required, can be removed after the locking devices are released.

The wind deflecting body, whose circumference widens toward the front, guides the air current to the front and over the headrests of the vehicle seats without subjecting an occupant to the air current in an unpleasant manner. The surface of the wind deflecting body which projects upwards in the front must be at least so wide and so high that a headrest situated in front of it is situated within the flow-around line of the wind deflecting body. In addition, it is advantageous for the air current to be deflected by means of the wind deflecting body also to over the windshield.

So that the wind deflecting body does not completely block the space on the vehicle body behind the seats, and is not situated, for example, in the course of movement of a vehicle roof which can be automatically lowered into the trunk, each wind deflecting body is detachably fixed to the vehicle body, in which case the wind deflecting bodies, as required, must then be put into operation individually.

Because of their compact shape, the wind deflecting bodies can easily be stored in the vehicle trunk when they are not in use. In the case of conventional wind blocking frames, which extend along the whole vehicle width, there may be a storage problem because of this width. In addition, despite their large height of the surface projecting upward in the front for the deflecting of the air, the wind deflecting bodies provide the vehicle with a sporty character.

The hollow space of the wind deflecting body allows the accommodating of a rollover bar assigned to each vehicle seat so that each wind deflecting body finds a sufficient surface for the fixing on the vehicle body, and the wind deflecting body can also be locked on the rollover bar. A provided reaching under the rear lid by a bracket on the wind deflecting body, whereby it is fixed in a locked manner when the rear lid is closed, holds the wind deflecting body securely on the vehicle body without any additional expenditures.

In addition, a wind blocking net may be mounted between the two wind deflecting bodies assigned to the headrests and may be fixed to them, whereby the passenger compartment is blocked off along the whole width against draft air.

In order to intensify the shielding of the occupant from draft air by means of the wind deflecting body, the wind deflecting body may be designed such that its forward frame can be pulled out toward the front in the same shape in the manner of a telescope. Furthermore, a flat plate, which can be pulled out, can be provided here as a sun protection device.

An additional possible embodiment provides a storage space in the hollow space of the wind deflecting body whose opening is closed by means of a covering which can be swivelled open. This storage space may also be used for accommodating sound systems.

Other objects, advantages and novel features of the present invention will become apparent from the following detailed description of the invention when considered in conjunction with the accompanying drawings.

DETAILED DESCRIPTION OF THE DRAWINGS

Figure 1:
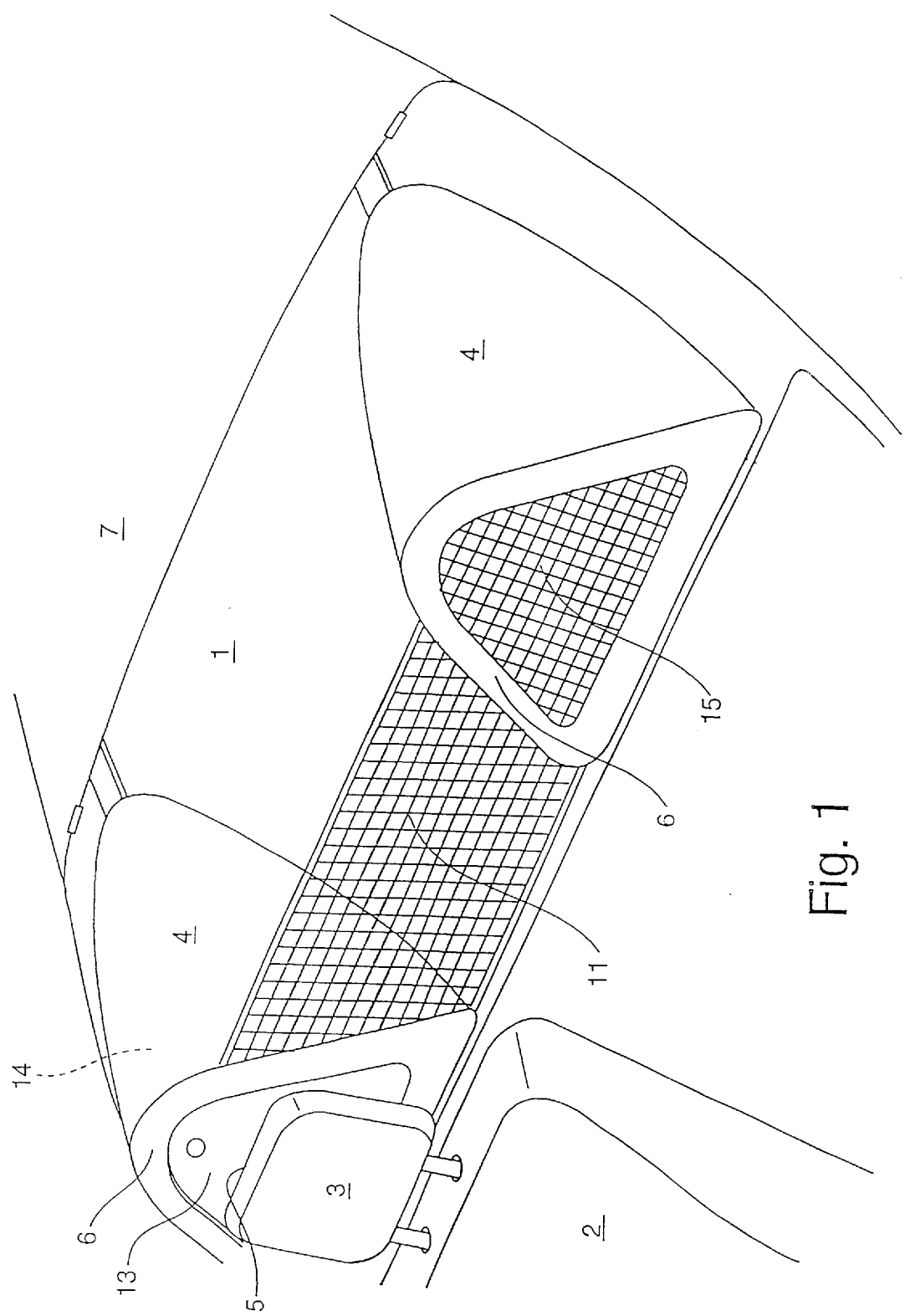
FIG. 1 is a perspective view from the front of two wind deflecting bodies arranged behind a seat of a convertible, constructed according to a preferred embodiment of the invention.

The drawing figures are perspective partial views of a two-seat convertible on whose vehicle body 1 (rear top side) a wind deflecting body 4 is placed and fixed in each case behind the seat 2 at the level of the headrest 3. (One of the seats was not shown in FIG. 1).

The wind deflecting body 4 is constructed as a hollow body which widens toward the front in its circumference with a parabolic outer contour. Thus the wind deflecting body 4 deflects the air current from a rearward point, widening laterally and upwards, to the breakaway edge on a forward-situated, perpendicularly projecting area 6. In this case, the wind deflecting body 4 projects from the rear top side 1 upwards to approximately the height of the upper edge 5 of the headrest, the circumference of the headrest 3 being situated within the flow-around area of the surface 6 of the wind deflecting body projecting upward in the front. Each wind deflecting body 4 therefore deflects the air current arriving from the rear over the seat of the vehicle, whereby an occupant is not disturbed by this air current.

As required, the releasably locked wind deflecting bodies 4 can be removed from the rear top side 1 when, for example, the roof, which is not shown here and is stored under a rear lid 7, is to be displaced into its covering position. Subsequently, the two wind deflecting bodies 4, which require relatively little storage space because of their two-part characteristic, will find room in the space under the rear lid 7.

Figure 2:
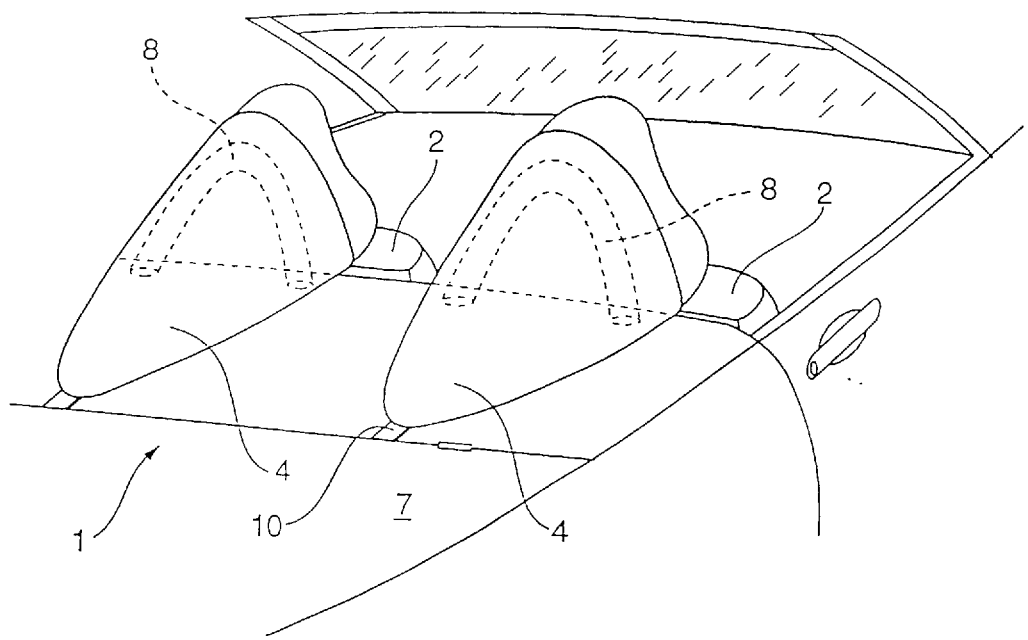
FIG. 2 is a diagonal rear view of the same wind deflecting bodies of FIG. 1 in a partial view of a convertible.
Figure 3:
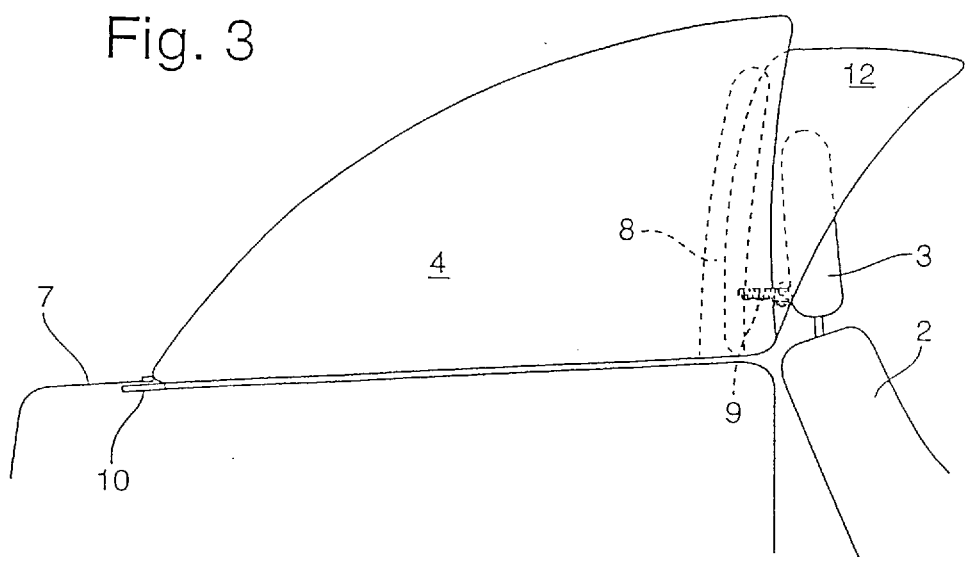
FIG. 3 is a lateral view of a wind deflecting body with a section which can be folded out.

As illustrated in FIGS. 2 and 3, the hollow space of the wind deflecting body 4 covers a rollover bar 8 which projects upwards behind the seat 2, so that the air deflecting body 4 can be guided closely to the headrest 3. In addition, by means of a locking member 9 on the wind deflecting body 4, the rollover bar 8 may also be used for a forward locking of the wind deflecting body 4. For the locking of the wind deflecting body 4 toward the rear, the rear lid 7 under which a bracket 10 on the wind deflecting body 4 reaches is used so that, as a result, the wind deflecting body 4 is fixed when the rear lid 7 is closed.

In order to protect the whole width of the interior from draft air, a wind blocking net 11 is mounted between the two wind deflecting bodies 4 and is fastened by means of conventional devices, such as snap fasteners, or similar devices (FIG. 1).

In a further embodiment illustrated in FIG. 2, the wind deflecting body 4 can be pulled out in the forward area in the manner of a telescope, whereby the shielding against the air current can be adjusted by the occupant.

As illustrated in FIG. 3, a plate-shaped sun protection device 12 can be swivelled out in the front on the wind deflecting body 4 which may be manufactured, for example, of a tinted plastic material and protects the occupant from any disturbing sun radiation from above. Corresponding to FIG. 2, this sun protection device 12 may also continue the outer contour of the wind deflecting body 4.

In additional construction possibilities, the hollow space of the wind deflecting body 4 is utilized as a storage space 14, which is accessible through an openable covering 13, or as a loudspeaker box 15.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wind deflecting body assembly for use with a vehicle seat having a headrest, comprising:
   a wind deflecting body with an outer contour which in use tapers from a forward contour projecting around a headrest to a rearward smaller contour,
   said outer contour extending vertically when in an in use position to a height corresponding to an upper edge of the head rest with a contour of the head rest being situated within the flow around area of exterior facing surfaces of the wind deflecting body,
   and at least one releasable latching member for connecting the wind deflecting body with a vehicle, whereby said wind deflecting body can be selectively moved between an in use position and a storage position independently of the headrest and of any other wind deflecting bodies of the vehicle.

2. An assembly according to claim 1, wherein said at least one releasable latching member includes a member fixed to the wind deflecting body and projecting rearwardly thereof to be selectively clamped by a vehicle body lid covering a storage space.

3. An assembly according to claim 1, wherein said at least one releasable latching member includes a detent disposed at a front of the wind deflecting body, which detent is selectively engageable with a counter detent fixed to an adjacent vehicle part.

4. An assembly according to claim 2, wherein said at least one releasable latching member includes a detent disposed at a front of the wind deflecting body, which detent is selectively engageable with a counter detent fixed to an adjacent vehicle part.

5. An assembly according to claim 1, wherein said wind deflecting body forms a hollow storage space.

6. An assembly according to claim 5, comprising a sound system loudspeaker disposed in the hollow space.

7. An assembly according to claim 5, wherein said hollow space is configured to cover a rollover bar fixed to the vehicle behind the headrest.

8. An assembly according to claim 1, comprising a sun protection device disposed at a forward end of the wind deflecting body.

9. An assembly according to claim 3, wherein said adjacent vehicle part is a rollover bar.

10. An assembly according to claim 4, wherein said adjacent vehicle part is a rollover bar.

11. An assembly according to claim 1, comprising a sun protection device accommodated in the outer contour of the wind deflecting body.

12. A wind deflecting assembly for a convertible vehicle with respective first and second laterally spaced seats which have respective seat head rests, said wind deflecting assembly comprising:
   a first wind deflecting body disposable in use behind the first seat head rest and having an outer wind deflecting contour which in use tapers from a forward contour projecting around the first head rest to a rearward smaller contour, said outer contour extending vertically when in an in use position to a height corresponding approximately to an upper edge of the first head rest with a contour of the first head rest being situated within the forward contour of the first wind deflecting body,
   and a first selectively releasable latching connection for connecting the first wind deflecting body to the vehicle such that the first wind deflecting body can be selectively moved between said in use position and a storage position independently of said first head rest and of any other vehicle wind deflecting structure.

13. An assembly according to claim 12, wherein the first deflecting body is configured to cover a first rollover bar behind the first seat when in the in use position.

14. An assembly according to claim 13, wherein said first latching connection includes a latching connection between the first wind deflecting body and the first rollover bar.

15. An assembly according to claim 12, wherein said first latching connection includes a rearward tapering end of the first wind deflecting body which is clamped under a rear lid of the vehicle when in the in use position.

16. An assembly according to claim 13, wherein said first latching connection includes a rearward tapering end of the first wind deflecting body which is clamped under a rear lid of the vehicle when in the in use position.

17. An assembly according to claim 12, comprising:

a second wind deflecting body disposable in use behind the second seat head rest and having an outer wind deflecting contour which in use tapers from a forward contour projecting around the second head rest to a rearward smaller contour, said outer contour extending vertically when in an in use position to a height corresponding approximately to an upper edge of the second head rest with a contour of the second head rest being situated within the forward contour of the second wind deflecting body, and a second selectively releasable latching connection for connecting the second wind deflecting body to the vehicle such that the second wind deflecting body can be selectively moved between said in use position and a storage position independently of said second head rest and of any other vehicle wind deflecting structure.

18. An assembly according to claim 17, comprising a wind blocking net extending between and connected to the first and second wind deflecting bodies.

19. An assembly according to claim 12, comprising a first sun protection device movably mounted in said first wind deflection body for movement between a covered inoperative position and an in use position.

20. An assembly according to claim 19, wherein the outer contour of the first wind deflecting body is extended by said first sun protection device when in its in use position.

21. An assembly according to claim 12, wherein the first wind deflecting body defines a hollow storage space for a loudspeaker box.

22. An assembly according to claim 12, wherein the first wind deflecting body defines a hollow space which in use covers a first rollover bar.

23. An assembly according to claim 17, wherein each of said wind deflecting bodies define respective hollow storage spaces.

24. An assembly according to claim 17, wherein sun protection devices are disposed in each of said wind deflecting bodies and movable between respective operative and inoperative positions.

25. An assembly according to claim 17, wherein each of said wind deflecting bodies are configured to cover respective roll bars behind the respective seats when in in use positions.

* * * * *